United States Patent
Izumi et al.

(10) Patent No.: US 10,467,020 B2
(45) Date of Patent: Nov. 5, 2019

(54) MEMORY DEVICE, AND INFORMATION-PROCESSING DEVICE

(71) Applicant: TOSHIBA MEMORY CORPORATION, Minato-ku (JP)

(72) Inventors: Yuji Izumi, Yokohama (JP); Kenichi Maeda, Kamakura (JP); Kenji Funaoka, Kawasaki (JP); Reina Nishino, Yokohama (JP); Toshio Fujisawa, Yokohama (JP); Nobuhiro Kondo, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 172 days.

(21) Appl. No.: 15/255,729

(22) Filed: Sep. 2, 2016

(65) Prior Publication Data

US 2017/0249167 A1    Aug. 31, 2017

Related U.S. Application Data

(60) Provisional application No. 62/300,198, filed on Feb. 26, 2016.

(51) Int. Cl.
   *G06F 9/4401*    (2018.01)
   *G06F 3/06*      (2006.01)

(52) U.S. Cl.
   CPC ......... *G06F 9/4418* (2013.01); *G06F 3/0604* (2013.01); *G06F 3/0625* (2013.01); *G06F 3/0647* (2013.01); *G06F 3/0685* (2013.01)

(58) Field of Classification Search
   None
   See application file for complete search history.

(56) References Cited

U.S. PATENT DOCUMENTS

| | | | | |
|---|---|---|---|---|
| 4,639,863 A | * | 1/1987 | Harrison | G06F 3/0601 360/902 |
| 5,345,347 A | * | 9/1994 | Hopkins | G06F 1/3215 360/71 |
| 8,880,781 B2 | | 11/2014 | Hong | |
| 2001/0037475 A1 | * | 11/2001 | Bradshaw | G06F 8/71 714/15 |
| 2003/0188115 A1 | * | 10/2003 | Maezawa | G06F 9/4418 711/162 |
| 2007/0097424 A1 | * | 5/2007 | Mizuno | G06F 1/3215 358/1.15 |

(Continued)

FOREIGN PATENT DOCUMENTS

| | | |
|---|---|---|
| JP | 10-254590 | 9/1998 |
| JP | 2008-287492 | 11/2008 |
| JP | 2012-104110 | 5/2012 |

*Primary Examiner* — Paul Yen
(74) *Attorney, Agent, or Firm* — Oblon, McClelland, Maier & Neustadt, L.L.P.

(57) ABSTRACT

According to one embodiment, the memory device includes a non-volatile memory, a volatile memory, and a controller. The controller carries out the transition to two different sleep states depending on a sleep instruction from the host device and saves sleep state information indicating the sleep state after the transition to the host-side storage device. Upon receiving a return instruction from the host device, the controller carries out return processing in accordance with the sleep state information stored in the host-side storage device.

4 Claims, 10 Drawing Sheets

(56) References Cited

U.S. PATENT DOCUMENTS

| | | | |
|---|---|---|---|
| 2011/0035646 A1* | 2/2011 | Nakanishi | G06F 11/1068 |
| | | | 714/763 |
| 2011/0191614 A1* | 8/2011 | Tsuzuki | G06F 1/32 |
| | | | 713/320 |
| 2012/0317352 A1* | 12/2012 | Kang | G11C 11/40611 |
| | | | 711/106 |
| 2015/0052341 A1* | 2/2015 | Saiki | G06F 9/4401 |
| | | | 713/2 |
| 2015/0074330 A1 | 3/2015 | Sawamura et al. | |
| 2015/0242141 A1 | 8/2015 | Kuo et al. | |

\* cited by examiner

MEMORY DEVICE, AND INFORMATION-PROCESSING DEVICE

CROSS-REFERENCE TO RELATED APPLICATIONS

This application is based upon and claims the benefit of priority from U.S. Provisional Application No. 62/300,198, filed on Feb. 26, 2016; the entire content of which are incorporated herein by reference.

FIELD

Embodiments described herein relate generally to a memory device and an information-processing device.

BACKGROUND

A memory device is connected to a host device as an external storage device of the host device. In the past, data temporarily stored in a random access memory (RAM) of the memory device has been lost when a power supply for the memory device is shut off. For this reason, data within the RAM has been saved to a non-volatile memory in a case where the power supply for the memory device is shut off. The data has been then transferred to the RAM from the non-volatile memory during return processing of the memory device.

DETAILED DESCRIPTION

In general, according to one embodiment, a memory device connected to a host device having a host-side storage device is provided. The memory device includes a non-volatile memory, a volatile memory, and a controller. The volatile memory stores data written to or read from the non-volatile memory and stores management information which manages a storage location of the data stored in the non-volatile memory. The controller transfers data between the non-volatile memory and the volatile memory based on an instruction from the host device. The controller carries out the transition to two different sleep states depending on a sleep instruction from the host device and saves sleep state information indicating the sleep state after the transition to the host-side storage device. Upon receiving a return instruction from the host device, the controller carries out return processing in accordance with the sleep state information stored in the host-side storage device.

Exemplary embodiments of the memory device and an information-processing device will be explained below in detail with reference to the accompanying drawings. The present invention is not limited to the following embodiments.

(First Embodiment)

Figure 1:
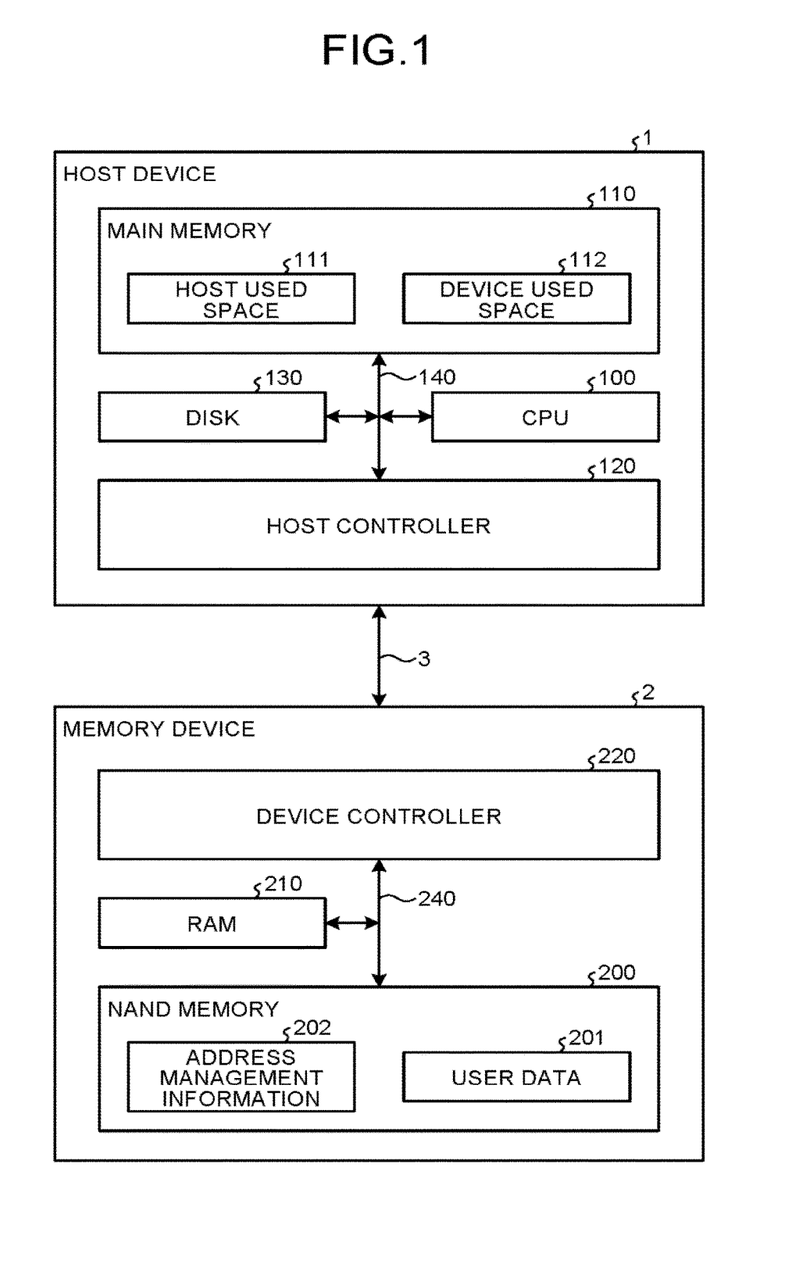
FIG. 1 is a diagram schematically illustrating an exemplary basic hardware configuration of an information-processing device according to a first embodiment.

FIG. 1 is a diagram schematically illustrating an exemplary basic hardware configuration of an information-processing device according to a first embodiment. The information-processing device includes a host device (external device) 1 and a memory device 2 functioning as an external storage device of the host device 1. The information-processing device has unified memory architecture (UMA), where the host device 1 and the memory device 2 share a memory included in the host device 1 (a main memory 110 described later). Examples of the information-processing device include a personal computer, a mobile phone, a smartphone, a tablet terminal, and an image pickup device, The host device 1 and the memory device 2 are connected through a communication path 3. A communication standard of the communication path 3 is, for example, a standard defined in the mobile industry processor interface (MIPI). The communication conforms to M-PHY in a physical layer, while conforming to the UniPro standard in a link layer.

The host device 1 includes a central processing unit (CPU) 100, the main memory (host-side storage device) 110, a host controller 120, and a disk 130. The CPU 100, the main memory 110, the host controller 120, and the disk 130 are mutually interconnected through a bus 140.

The CPU 100 executes an operating system (OS) and a user program. The main memory 110 is constituted by a dynamic RAM (DRAM) or the like. The main memory 110 includes a host used space 111 and a device used space 112. The host used space 111 is used as a program load region while the host device 1 executes the OS or the user program, or alternatively, used as a work area while the host device 1 executes the program loaded in the program load region.

The device used space 112 is a data storage space allocated to a device other than the host device 1 (e.g., the memory device 2). The device used space 112 is used as a cache space for data transmitted to or received from the memory device 2. Examples of the data transmitted to or received from the memory device 2 include data held in a RAM 210 of the memory device 2, information used for reducing a time required for the return processing of the memory device 2, and data written to or read from the memory device 2.

The host controller 120 includes a connection interface for the communication path 3 and controls data transfer between the memory device 2 and the main memory 110. The host controller 120 also controls data transfer between the main memory 110 and the disk 130.

The disk 130 stores, for example, excess data that cannot be stored in the main memory 110. The disk 130 is constituted by a hard disk or the like.

The memory device 2 includes a NAND-type flash memory (hereinafter, referred to as NAND memory) 200 serving as an example of a non-volatile storage device, the RAM (volatile memory) 210, and a device controller 220 (controller). The NAND memory 200, the RAM 210, and the device controller 220 are connected through a bus 240.

The NAND memory 200 is constituted by one or more memory chips including a memory cell array. The memory cell array is configured by a plurality of memory cells arranged in a matrix shape. Furthermore, each block within the memory cell array is configured by a plurality of pages. Each page serves as a unit for reading or writing data, for example.

The NAND memory 200 stores user data 201 transmitted from the host device 1 and address management information 202. Examples of the user data 201 include an OS for which the host device 1 provides an execution environment, a user program executed by the host device 1 on the OS, and data input or output by the OS or the user program.

The address management information 202 is one component of information required for the memory device 2 to function as the external storage device of the host device 1. The address management information 202 is address conversion information that associates a logical block address (LBA) used by the host device 1 during the access to the memory device 2 with a physical address within the NAND memory 200 (a block address+a page address+a storage location within a page).

The RAM 210 is used as a buffer storing data to be written to the NAND memory 200 or data read from the NAND memory 200, or part of the address management information 202. The RAM 210 is also used as a command queue that queues commands input from the host device 1 relating to a write request, a read request, an instruction for changing an operation mode, and the like. In addition, the RAM 210 is used as a memory storing, for example, firmware used to operate the memory device 2. The RAM 210 is constituted by a small static RAM (SRAM), a DRAM, or the like. Meanwhile, the function of the RAM 210 may be substituted by a register or the like.

The device controller 220 includes a connection interface for the communication path 3 and controls data transfer between the host device 1 and the RAM 210. The device controller 220 also controls data transfer between the RAM 210 and the NAND memory 200 (writing data to the NAND memory 200 or reading data from the NAND memory 200).

For example, the device controller 220 is constituted by a micro computer unit including an arithmetic device and a storage device. The function of the device controller 220 is realized when the arithmetic device executes, on the RAM 210, firmware stored in the storage device in advance. The device controller 220 may include the plurality of arithmetic devices. In addition, the storage device of the device controller 220 may be omitted such that the firmware is stored in the NAND memory 200.

The following description of the embodiments assumes the memory device 2 as, for example, a flash memory or a solid state drive (SSD) for built-in use complying with the universal flash storage (UFS) standard. Therefore, commands and the like described hereinafter conform to the UFS standard.

The memory device 2 according to the embodiment has the plurality of operation modes. Here, an example where the memory device 2 has a normal operation mode, a low power consumption mode, and a power shut-off mode is used. The normal operation mode is an operation mode in which writing to the NAND memory 200 or reading from the NAND memory 200 is carried out based on an instruction from the host device 1.

The low power consumption mode is a mode in which the power consumption of the NAND memory 200, the RAM 210, and the device controller 220 becomes zero and data held by the RAM 210 is saved to the main memory 110 of the host device 1 (hereinafter, also referred to as 0 mW sleep). The data saved to the main memory 110 is data used for the return processing of the memory device 2 and examples thereof include address information and internal status data of the memory device 2. In a case where the memory device 2 is in a 0 mW sleep state, the return processing to the normal operation mode is carried out based on a return instruction command (fDeviceResume command). The fDeviceResume command is a command that causes the device controller 220 to carry out the return processing of the memory device 2 using the data saved in the main memory 110.

The power shut-off mode is a mode in which the power supplies for all of the NAND memory 200, the RAM 210, and the device controller 220 in the memory device 2 are shut off and the data held by the RAM 210 is saved to the NAND memory 200 (hereinafter, also referred to as power down sleep). The power shut-off mode is distinguished from the 0 mW sleep (low power consumption mode) in that the data within the RAM 210 is saved to the NAND memory 200 prior to the transition to the power shut-off mode. In the power down sleep, the return processing to the normal operation mode is carried out based on the return instruction command (fDeviceInit command). The fDeviceInit command is a command that causes the device controller 220 to carry out the return processing of the memory device 2 using the data saved in the NAND memory 200.

Note that the low power consumption mode and the power shut-off mode are referred to as sleep state in the present description. Accordingly, an instruction for switching to the power shut-off mode and an instruction for switching to the low power consumption mode are referred to as sleep instruction command. In addition, processing for switching to the normal operation mode from the sleep state is referred to as the return processing. The transition from the power shut-off mode during which the memory device 2 is initialized is referred to as initialization processing when the transition from the power shut-off mode needs to be distinguished from the return processing from the low power consumption mode.

The device controller 220 according to the embodiment saves sleep state information to the main memory 110 of the host device 1 during the transition to the sleep state. The sleep state information is information indicating whether the memory device 2 is in the power down sleep or the 0 mW sleep.

The device controller 220 also saves information stored in the RAM 210 to the main memory 110 of the host device 1 during the transition to the 0 mW sleep. Examples of the information saved to the main memory 110 include the internal status data of the memory device 2 and the address management information which manages the storage location of data within the NAND memory 200.

The device controller 220 saves the address management information and data to the NAND memory 200 among the information stored in the RAM 210 during the transition to the power down sleep.

As a result, upon receiving the return instruction command from the host device 1, the device controller 220 of the memory device 2 can determine whether the return instruction command is invalid using the sleep state information in the main memory 110. In other words, the device controller 220 no longer needs to make a query to the host device 1 upon receiving the return instruction command.

For example, in a case where the sleep state information records that the transition to the power down sleep has been done, the fDeviceInit command is used for the return processing. When the device controller 220 receives the fDeviceResume command, however, the device controller 220 can determine the command as an error for itself and return an error response to the host device 1. Meanwhile, in a case where the sleep state information records that the transition to the 0 mW sleep has been done, the fDeviceResume command is used for the return processing. When the device controller 220 receives the fDeviceInit command, however, the device controller 220 can determine the command as an error for itself and return an error response to the host device 1.

Figure 2:
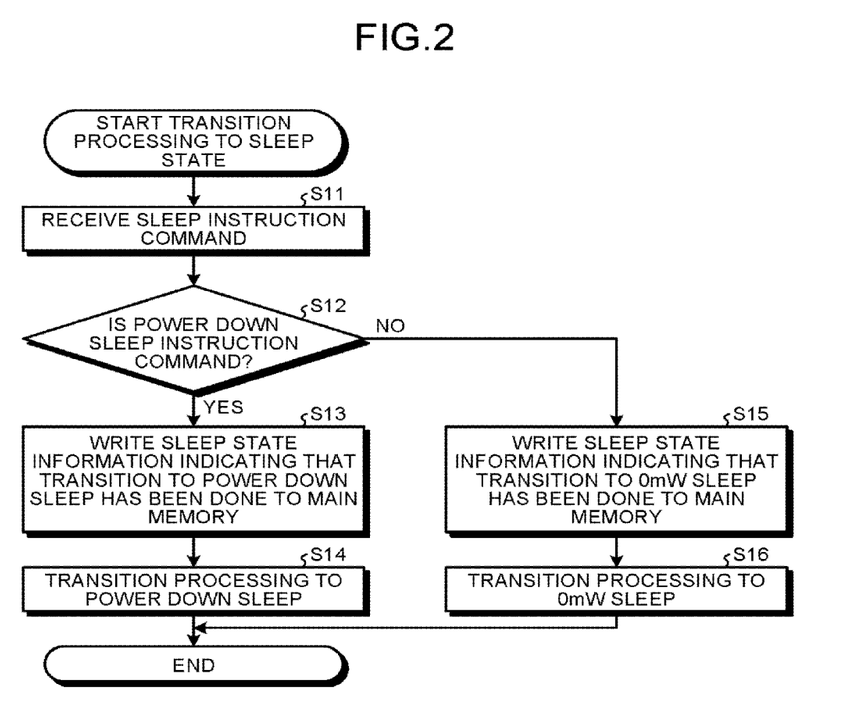
FIG. 2 is a flowchart illustrating an exemplary procedure for transition processing to a sleep state according to the first embodiment.

Next, the operation of such the information-processing device will be described. FIG. 2 is a flowchart illustrating an exemplary procedure for transition processing to the sleep state according to the first embodiment. First, upon receiving the sleep instruction command from the host device 1 (step 211), the device controller 220 determines a type of the sleep instruction command. For example, it is determined whether the sleep instruction command is a power down sleep instruction command (step S12).

When the sleep instruction command is the power down sleep instruction command (step S12: Yes), the device controller 220 writes the sleep state information indicating that the transition to the power down sleep has been done to the main memory 110 (device used space 112) of the host device 1 (step S13). Subsequently, the device controller 220 carries out the transition processing to the power down sleep (step S14). At this time, the device controller 220 saves the data saved in the RAM 210 to the NAND memory 200. The processing is then terminated.

Meanwhile, when the sleep instruction command is a 0 mW sleep command in step S12 rather than the power down sleep instruction command (step S12: No), the device controller 220 writes the sleep state information indicating that the transition to the 0 mW sleep has been done to the main memory 110 of the host device 1 (step S15). Subsequently, the device controller 220 carries out the transition processing to the 0 mW sleep (step S16). At this time, the device controller 220 saves the data saved in the RAM 210 to the main memory 110 of the host device 1. The processing is then terminated.

Figure 3:
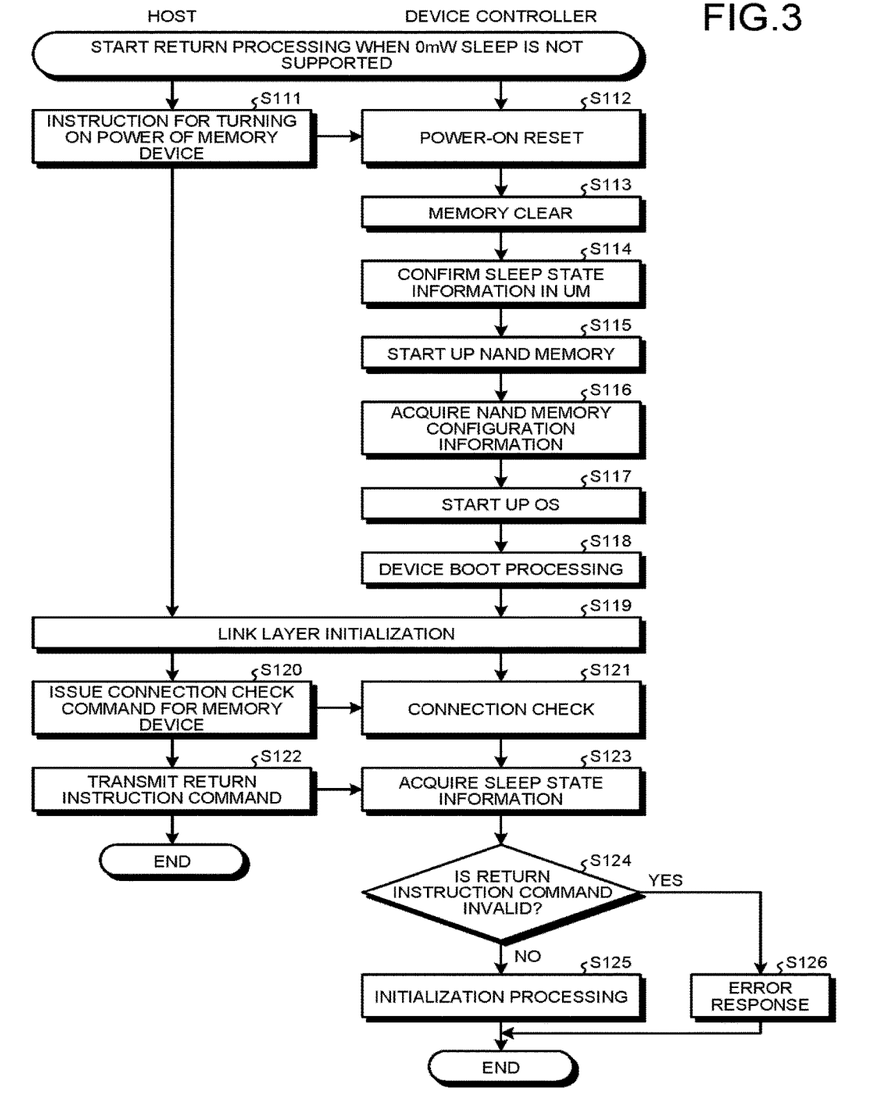
FIG. 3 is a flowchart illustrating an exemplary procedure for return processing from power down sleep.

FIG. 3 is a flowchart illustrating an exemplary procedure for the return processing from the power down sleep. Here, the memory device 2 is assumed to be in a power down sleep state. When the host device 1 supplies power to the memory device 2 in this state (step S111), the device controller 220 carries out power-on reset processing that initializes an internal circuit, an internal register, and the like (step S112) and then starts up the firmware. Subsequently, the device controller 220 clears the RAM 210 (step S113) to make the RAM 210 readable and writable.

Subsequently, the device controller 220 confirms the sleep state information in the main memory 110 of the host device 1 (step S114). Here, the device controller 220 confirms that the power down sleep state has continued until that time point.

Thereafter, the device controller 220 starts up the NAND memory 200 (step S115) to make the data stored in the NAND memory 200 readable. The device controller 220 also acquires NAND memory configuration information from the NAND memory 200 (step S116). The NAND memory configuration information is information required for the device controller 220 to access the NAND memory 200. Examples of the NAND memory configuration information include the number of the memory chips constituting the NAND memory 200, an address configuration within the NAND memory 200, and a memory capacity of the NAND memory 200. Subsequently, the device controller 220 starts up the OS of the host device 1 (step S117) and reads a boot loader from the NAND memory 200 to carry out device boot processing (step S118).

Thereafter, initialization processing of the link layer (link up) is carried out between the host device 1 and the device controller 220 (step S119). The host device 1 then issues a connection check command for the memory device 2 (step S120). A NOP OUT command can be exemplified as this connection check command. Upon receiving the connection check command, the device controller 220 checks the connection (step S121). For example, the connection is checked in such a manner that the device controller 220 only carries out command processing corresponding to the NOP OUT command and then returns a response to the host device 1.

Thereafter, the host device 1 transmits the return instruction command to the memory device 2 (step S122). Upon receiving the return instruction command, the device controller 220 acquires the sleep state information stored in the main memory 110 of the host device 1 (step S123). Subsequently, the device controller 220 determines whether the return instruction command is invalid based on the acquired sleep state information (step S124).

When the received return instruction command is not invalid (step S124: No), the initialization processing is carried out (step S125) and then the processing is terminated. For example, such processing is carried out as the initialization processing that the address information is restored and the internal register is set in the RAM 210 based on the information saved in the NAND memory 200. Meanwhile, when the received return instruction command is invalid (step S124: Yes), the device controller 220 returns the error response to the host device 1 (step S126) and then the processing is terminated.

For example, the return instruction command for the power down sleep is the fDeviceInit command. Accordingly, in a case where the sleep state information records the "power down sleep" and the fDeviceInit command is received from the host device 1, the return instruction command is not invalid and thus the initialization processing is carried out. Meanwhile, in a case where the sleep state information records the "power down sleep" and the fDeviceResume command is received from the host device 1, the return instruction command is invalid. Accordingly, the initialization processing is not carried out and the error response is returned to the host device 1.

Figure 4:
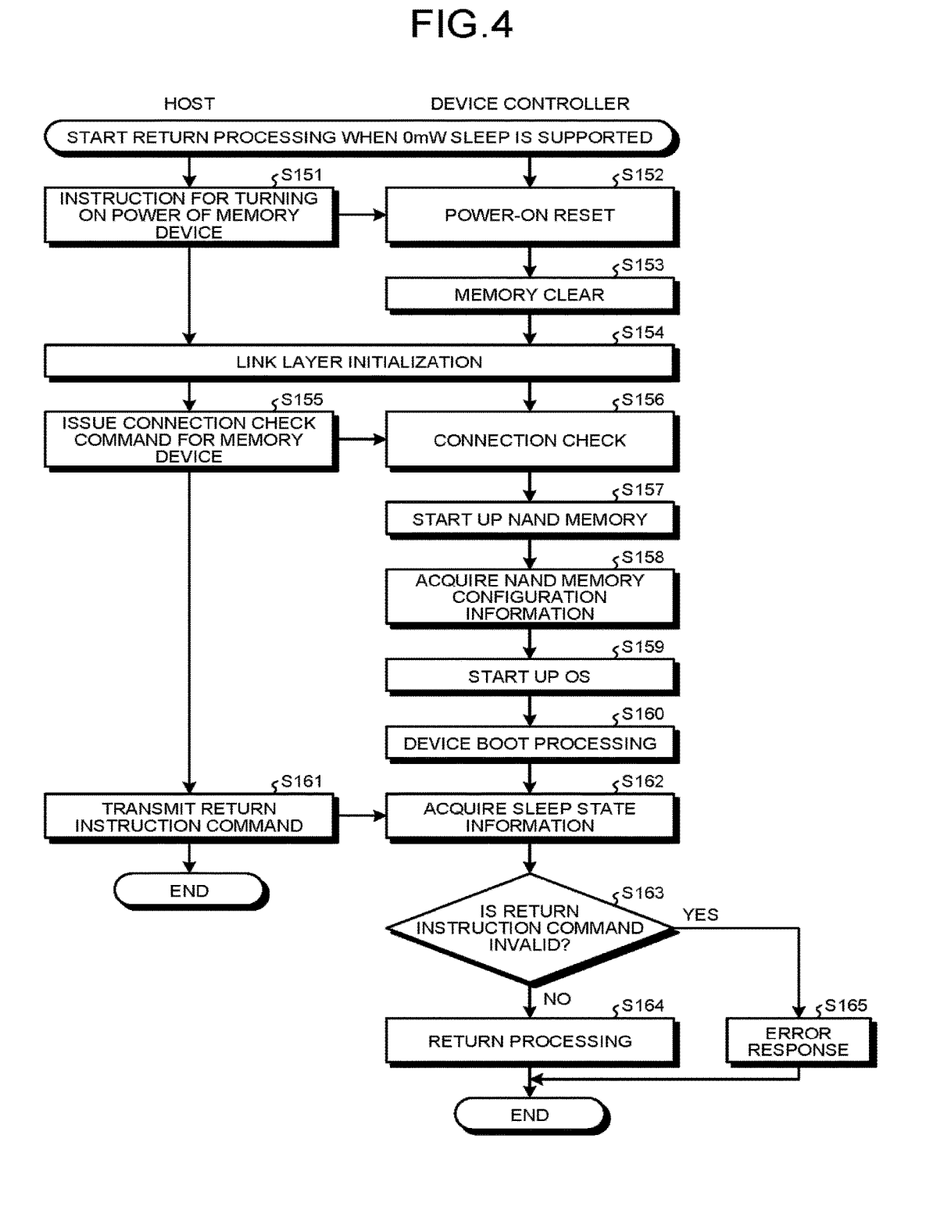
FIG. 4 is a flowchart illustrating an exemplary procedure for the return processing from 0 mW sleep.

FIG. 4 is a flowchart illustrating an exemplary procedure for the return processing from the 0 mW sleep. Here, the memory device 2 is assumed to be in the 0 mW sleep state. When the host device 1 supplies power to the memory device 2 in this state (step S151), the device controller 220 carries out the power-on reset processing (step S152). Subsequently, the device controller 220 clears the RAM 210 (step S153).

Thereafter, the initialization processing of the link layer is carried out between the host device 1 and the device controller 220 (step S154). The host device 1 then issues the connection check command for the memory device 2 (step S155). Upon receiving the connection check command, the device controller 220 checks the connection (step S156).

Thereafter, the device controller 220 starts up the NAND memory 200 (step S157). In addition, the device controller 220 acquires the NAND memory configuration information from the NAND memory 200 (step S158), starts up the OS (step S159), and carries out the device boot processing (step S160).

After checking the connection with the device, the host device 1 transmits the return instruction command to the device controller 220 (step S161). Upon receiving the return instruction command, the device controller 220 acquires the sleep state information stored in the main memory 110 of the host device 1 (step S162). Subsequently, the device controller 220 determines whether the return instruction command is invalid based on the acquired sleep state information (step S163).

When the received return instruction command is not invalid (step S163: No), the return processing is carried out (step S164) and then the processing is terminated. For example, the address information saved in the main memory 110 of the host device 1 and status data of the internal register are set in the memory device 2 as the return processing. Meanwhile, when the received return instruction command is invalid (step S163: Yes), the device controller 220 returns the error response to the host device 1 (step S165) and then the processing is terminated.

For example, the return instruction command for the 0 mW sleep is the fDeviceResume command. Accordingly, in a case where the sleep state information records the "0 mW sleep" and the fDeviceResume command is received from the host device 1, the return instruction command is not invalid and thus the return processing is carried out. Meanwhile, in a case where the sleep state information records the "0 mW sleep" and the fDeviceInit command is received from the host device 1, the return instruction command is invalid. Accordingly, the return processing is not carried out and the error response is returned to the host device 1.

According to the first embodiment, at the time of the transition of the memory device 2 to the sleep state, the sleep state information has been recorded to the main memory 110 of the host device 1, which sleep state information indicates whether that transition is the transition to the power down sleep or the transition to the 0 mW sleep. With this, upon receiving the return instruction command from the host device 1, the device controller 220 can carry out the initialization processing or the return processing without confirming with the host device 1. As a result, it is possible to reduce a time required for the return processing compared to a case where the processing is carried out after confirming with the host device 1.

Additionally, in a case where the return instruction command is determined to be invalid based on the sleep state information, the error response can be returned to the host device 1 without executing an invalid sequence.

Furthermore, in the transition to the 0 mW sleep, data used during the returning has been configured to be saved to the main memory 110 of the host device 1 rather than the NAND memory 200. Accordingly, the power supply for the memory device 2 can he shut off regardless of the limitation of the number of times of writing to the RAND memory 200. When the power supply is returned, the data used during the returning can be restored by accessing the main memory 110. Therefore, a returning time can be reduced compared to a case where the NAND memory 200 is accessed.

In addition, the return processing in a case where the 0 mW sleep is not support has been configured such that the NAND memory 200 is started up without waiting for the connection check command (NOP/OUT) from the host device 1. Typically, a certain time is required to receive the connection check command since the power-on reset has been carried out. However, the NAND memory 200 is configured to start up during this waiting time and thus the startup time of the memory device 2 can be reduced.

(Second Embodiment)

The first embodiment has indicated a case where the sleep state information of the memory device is saved to the main memory. A second embodiment will exemplify a case where the NAND memory configuration information is saved to a main memory.

An information-processing device according to the second embodiment has a configuration similar to that illustrated in FIG. 1 in the first embodiment. However, a device controller 220 has a function to save the NAND memory configuration information to the main memory 110 of a host device 1. The device controller 220 also has a function to read the NAND memory configuration information from the main memory 110 of the host device 1 during the return processing to set in a memory device 2.

The NAND memory configuration information is information required for the device controller 220 to access a NAND memory 200. Examples of the NAND memory configuration information include the number of the memory chips constituting the NAND memory 200, an address configuration within the NAND memory 200, and a memory capacity of the NAND memory 200.

Figure 5:
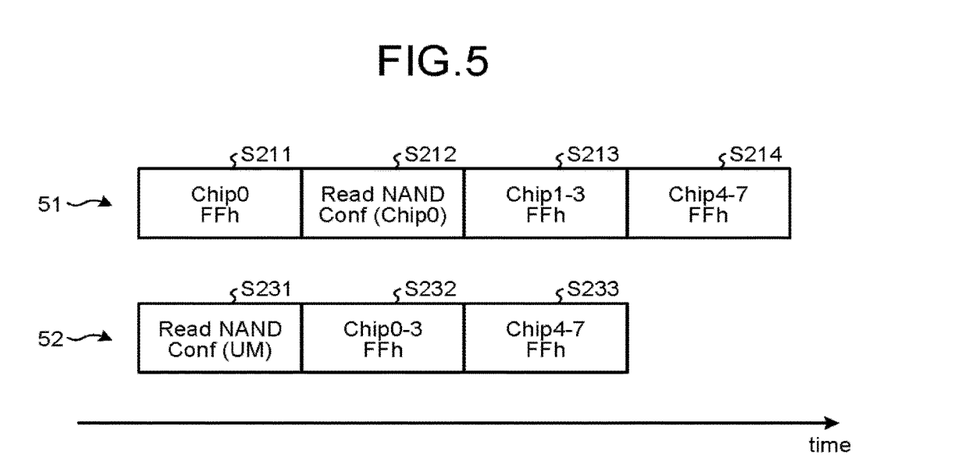
FIG. 5 is a diagram illustrating an exemplary procedure for reading NAND memory configuration information.

FIG. 5 is a diagram illustrating an exemplary procedure for reading the NAND memory configuration information. Processing 51 in FIG. 5 represents processing for reading the NAND memory configuration information according to a comparative example, whereas processing 52 represents processing for reading the NAND memory configuration information according to the second embodiment. In addition, a horizontal axis in FIG. 5 represents the passage of time.

The processing 51 according to the comparative example corresponds to, for example, the processing in steps S115 and S116 in FIG. 3. As illustrated in FIG. 5, the configuration information of the NAND memory 200 is unknown immediately after the memory device 2 is started up. Accordingly, the device controller 220 starts up a chip having the NAND memory configuration information that surely exists (step S211). Thereafter, the device controller 220 carries out processing for reading the NAND memory configuration information from that chip (step S212) and then starting up the other chips (steps S213 and S214).

For example, in a case where the NAND memory 200 is constituted by eight memory chips 0 to 7, the memory chip 0 in which the NAND memory configuration information is saved is started up (step S211) such that the NAND memory configuration information is read from the memory chip 0 (step S212) and thereafter, the memory chips 1 to 7 are started up (steps S213 and S214).

Meanwhile, the processing 52 according to the second embodiment corresponds to, for example, the processing in steps S157 and S158 in FIG. 4. First, the device controller 220 reads the NAND memory configuration information stored in the main memory 110 of the host device 1 (step S231). Thereafter, the device controller 220 refers to the content of the NAND memory configuration information to start up the memory chips constituting the NAND memory 200 (steps S232 and S233).

In a case where the NAND memory 200 is constituted by eight memory chips 0 to 7 similarly to the comparative example, the device controller 220 first reads the NAND memory configuration information from the main memory 110 (step S231). The read speed for the main memory 110 is much faster than the read speed for the NAND memory 200. Accordingly, a time required for reading the NAND memory configuration information is reduced. Thereafter, the memory chips 0 to 7 are started up in accordance with the NAND memory configuration information (steps S232 and S233).

In the second embodiment, the NAND memory configuration information has been saved to the main memory 110. Additionally, the NAND memory configuration information has been read from the main memory 110 immediately after the memory device 2 is started up and then the NAND memory 200 has been started up. As a result, compared to a case where the NAND memory configuration information is acquired after the NAND memory 200 is started up, it is possible to reduce the startup time of the memory device 2.

(Third Embodiment)

The first embodiment has saved the sleep state information to the main memory of the host device, while the second embodiment has saved the NAND memory configuration information to the main memory of the host device. A third embodiment will describe a case where whether abnormal power shut-off has occurred is saved to a main memory of a host device during the transition to the 0 mW sleep.

An information-processing device according to the third embodiment has a configuration similar to that illustrated in FIG. 1 in the first embodiment. However, a device controller 220 has a function to save power shut-off state information of a memory device 2 to the main memory 110 of the host device 1 prior to the transition to the 0 mW sleep. Examples of the power shut-off state information include whether abnormal power shut-off has occurred during the transition to the 0 mW sleep. More specifically, a record indicating that no abnormal power shut-off has occurred after the transition to the 0 mW sleep has been successfully completed is made. At this time, the device controller 220 saves data within the RAM 210 required for the return processing to the main memory 110 of the host device 1.

In addition, the device controller 220 has a function to refer to the power shut-off state information saved in the main memory 110 upon receiving the return instruction command. When no abnormal power shut-off has occurred, the device controller 220 skips an abnormal power shut-off measure during the return processing.

Figure 6:
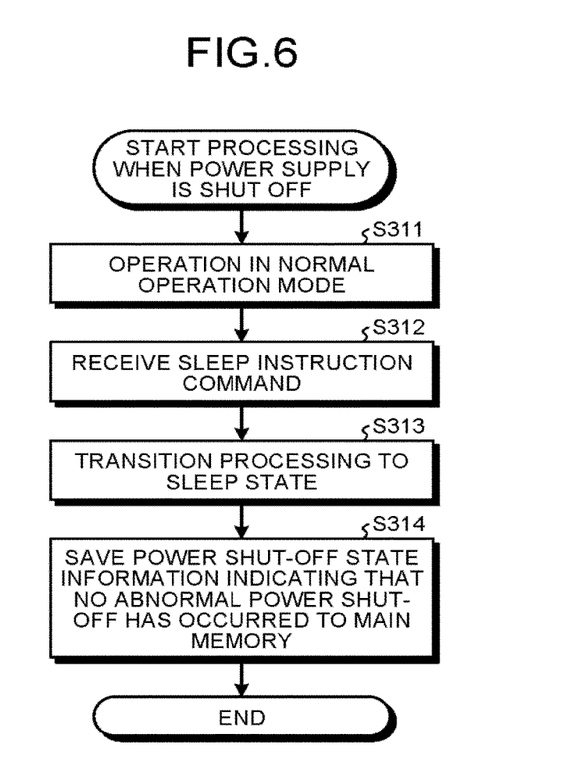
FIG. 6 is a flowchart illustrating an exemplary processing procedure when a power supply for a memory device is shut off according to a third embodiment.

FIG. 6 is a flowchart illustrating an exemplary processing procedure when the power supply for the memory device is shut off according to the third embodiment. First, the memory device 2 is assumed to operate in the normal operation mode (step S311). Upon receiving the sleep instruction command from the host device 1 (step S312), the device controller 220 carries out the transition processing to the sleep state (step S313). Here, data required for the return processing is processed so as to be transferred to the main memory 110 of the host device 1 or the NAND memory 200 of the memory device 2.

After the transfer processing is completed, the device controller 220 saves, to the main memory 110 of the host device 1, the power shut-off state information indicating that the transition to the sleep state has been successfully ended without the abnormal power shut-off (step S314). This concludes the processing when the power supply for the memory device 2 is shut off.

As described above, in the case of the transition to the sleep state in response to the sleep instruction command received from the host device 1, once the transfer processing of the data within the RAM 210 is completed, the power shut-off state information indicating that this transition is not the abnormal power shut-off is saved to the main memory 110. On the other hand, in the case of the abnormal power shut-off, the power supply for the memory device 2 is shut off because of that abnormal power shut-off and thus, whether the abnormal power shut-off has occurred cannot be saved to the main memory 110. In this example, accordingly, in the case of the abnormal power shut-off, it is not saved to the power shut-off state information that the abnormal power shut-off has occurred. Exemplary cases of the abnormal power shut-off include a case where the power supply for the memory device 2 is shut off without receiving the sleep instruction command from the host device 1, or a case where the power supply for the memory device 2 is shut off in response to the sleep instruction command but before the transfer processing for the data within the RAM 210 is completed.

Figure 7:
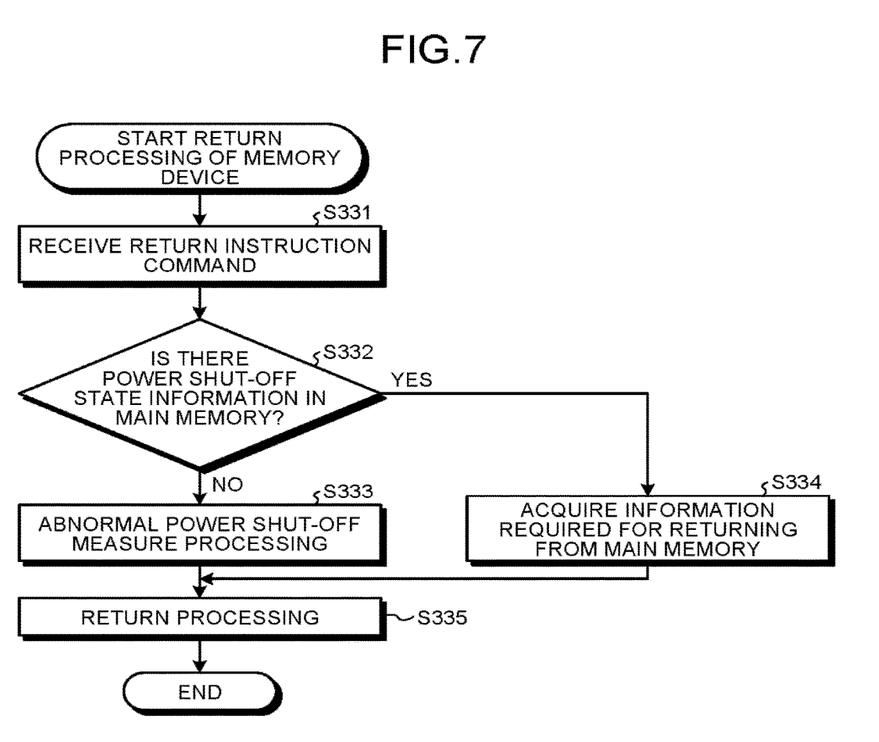
FIG. 7 is a flowchart illustrating an exemplary procedure for the return processing of the memory device according to a third embodiment.

FIG. 7 is a flowchart illustrating an exemplary procedure for the return processing of the memory device according to the third embodiment. Upon receiving the return instruction command from the host device 1 (step S331), the device controller 220 determines whether the power shut-off state information is recorded in the main memory 110 of the host device 1 (step S332).

When the power shut-off state information is not recorded in the main memory 110 (step S332: No), the device controller 220 determines the last power shut-off as the abnormal power shut-off and then carries out abnormal power shut-off measure processing (step S333). For example, the abnormal power shut-off measure processing is processing that reads, from the NAND memory 200, the configuration, the address information, and internal resister settings of the NAND memory 200.

On the other hand, when the power shut-off state information is recorded in the main memory 110 (step S332: Yes), the device controller 220 determines the last power shut-off as normal power shut-off and then acquires information required for the returning from the main memory 110 (step S334). For example, the information required for the returning is information such as the configuration, the address information, and the internal resister settings of the NAND memory 200, which need to be read from the NAND memory 200 in step S333.

After this step, or after step S333, the device controller 220 carries out the return processing (step S335) and then the processing is terminated.

The sleep instruction command in the above description may be a command instructing on the transition to the 0 mW sleep, or alternatively, may be a command instructing on the transition to the power down sleep.

In the third embodiment, once the sleep instruction command is received, the power shut-off ate information indicating that no abnormal power shut-off has occurred has been saved to the main memory 110 of the host device 1 after the data in the RAM 210 has been transferred to the main memory 110. Additionally, the main memory 110 is accessed for the power shut-off state information to be read when the return instruction command is received from the host device 1. When the power shut-off state information is not saved therein, the information required for the returning is read from the NAND memory 200 and the return processing is carried out after the abnormal power shut-off measure is carried out. On the other hand, when the power shut-off state information is saved therein, the information required for the returning is read from the main memory 110 of the host device 1 to be set in the RAM 210 and then the return processing is carried out. As a result, in a case where no abnormal power shut-off has occurred, the NAND memory 200 is not accessed and the abnormal power shut-off measure can be also skipped. Consequently, it is possible to reduce a time required for the return processing compared to a case where the abnormal power shut-off happens.

(Fourth Embodiment)

A fourth embodiment will describe a case where information indicating whether the 0 mW sleep is supported is held in a memory device and based on this information, a time required for the return processing (initialization processing) is reduced when the 0 mW sleep is not supported.

Figure 8:
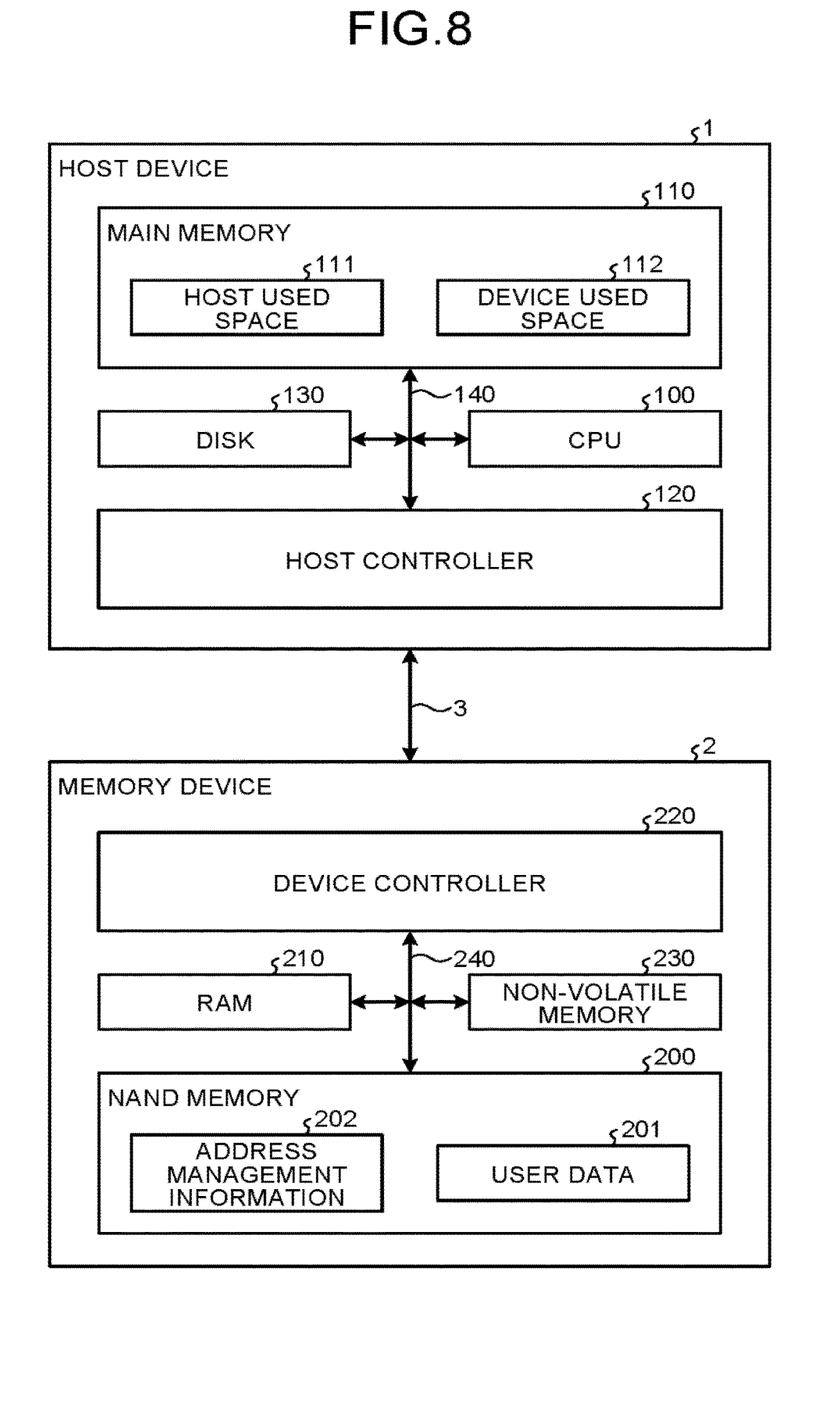
FIG. 8 is a diagram schematically illustrating an exemplary basic hardware configuration of an information-processing device according to a fourth embodiment.

FIG. 8 is a diagram schematically illustrating an exemplary basic hardware configuration of an information-processing device according to the fourth embodiment. The information-processing device according to the fourth embodiment includes a non-volatile memory 230 in addition to the configuration in FIG. 1. A non-volatile one time programmable (OTP) memory or a storage class memory (hereinafter, referred to as SCM) can be used as the non-volatile memory 230. The non-volatile OTP memory is a memory element fabricated using an electrically programmable fuse element. The SCM is a memory having an access speed faster than that of a NAND memory 200, while having a memory capacity smaller than that of the NAND memory 200. Examples thereof include a resistive random access memory (ReRAM), a magnetoresistive random access memory (MRAM), or a phase-change memory (PCM). Sleep state support information indicating whether the memory device 2 supports the 0 mW sleep is saved in the non-volatile memory 230.

Additionally, a device controller 220 reads the sleep state support information within the non-volatile memory 230 during the return processing from the sleep state. When the 0 mW sleep is supported, the device controller 220 carries out startup processing of the NAND memory 200 upon receiving a link layer initialization request from a host device 1. On the other hand, when the 0 mW sleep is not supported, the device controller 220 begins the startup processing of the NAND memory 200 without waiting for the link layer initialization request from the host device 1. The other components are similar to those described in the first embodiment and thus the description thereof will be omitted. Note that, however, the fourth embodiment assumes that power is not supplied to the NAND memory 200, a RAM 210, the device controller 220, and the non-volatile memory 230 during both of the 0 mW sleep and the power down sleep.

Figure 9:
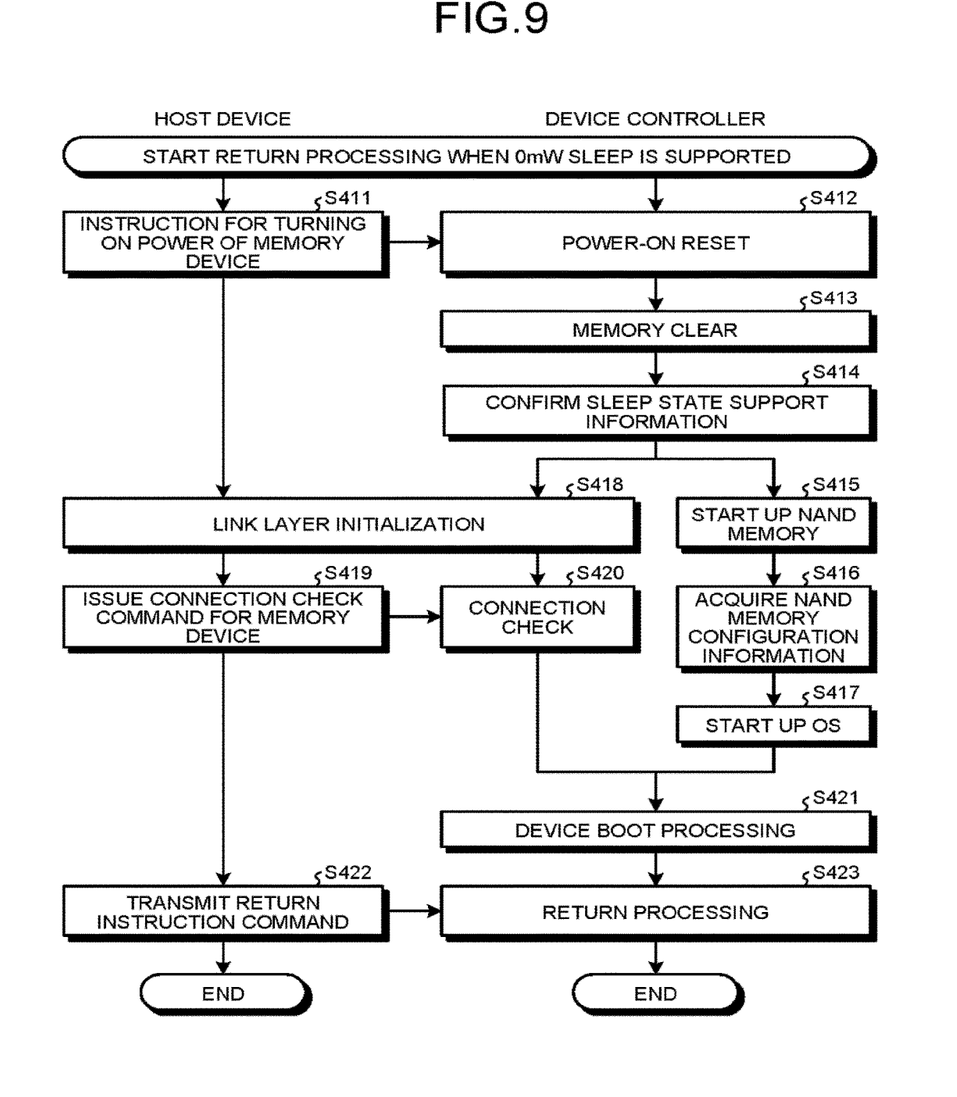
FIG. 9 is a flowchart illustrating an exemplary procedure for the return processing of the information-processing device in a case where a memory device supports the 0 mW sleep.

Next, the return processing from the sleep state will be described. FIG. 9 is a flowchart illustrating an exemplary procedure for the return processing of the information-processing device in a case where the memory device supports the 0 mW sleep. It is assumed here that it is written in the non-volatile memory 230 as the sleep state support information that the 0 mW sleep is supported. In addition, the memory device 2 is assumed to have transited to the 0 mW sleep.

First, when the host device 1 instructs the memory device 2 to turn on the power (step S411), the device controller 220 of the memory device 2 carries out the power-on reset processing (step S412). Thereafter, the device controller 220 clears the RAM 210 (step S413).

Subsequently, the device controller 220 reads the content of the non-volatile memory 230 to confirm the sleep state support information (step S414). Here using the assumption that the 0 mW sleep is supported, the device controller 220 recognizes that the 0 mW sleep is supported. Accordingly, the device controller 220 starts up the NAND memory 200 without waiting for a request for the initialization processing of the link layer from the host device 1 (step S415). The device controller also acquires the NAND memory configuration information from the NAND memory 200 that has started up (step S416) and starts up the OS (step S417).

Meanwhile, in case where the device controller 220 receives the link layer initialization request from the host device 1 while proceeding with steps S415 to S417, the device controller 220 carries out the initialization processing of the link layer between the host device 1 and the device controller 220 (step S418). In addition, the host device 1 issues the connection check command for the device (step S419) and then the device controller 220 checks the connection through response processing corresponding to the connection check command (step S420).

After this step, or after step S417, the device controller 220 carries out the device boot processing (step S421). Subsequently, the host device 1 transmits the return instruction command to the device controller 220 (step S422) and then the device controller 220 carries out the return processing corresponding to the 0 mW sleep (step S423). For example, this return processing is carried out in such a manner that the information required for the returning which is saved in the main memory 110 of the host device 1 is read out to the RAM 210 of the memory device 2. This terminates the processing.

As described above, in the memory device 2 supporting the 0 mW sleep, the startup processing of the NAND memory 200 and the initialization processing of the link layer is carried out in parallel, and then the connection between the host device 1 and the memory device 2 is established before the device boot processing is carried out.

Figure 10:
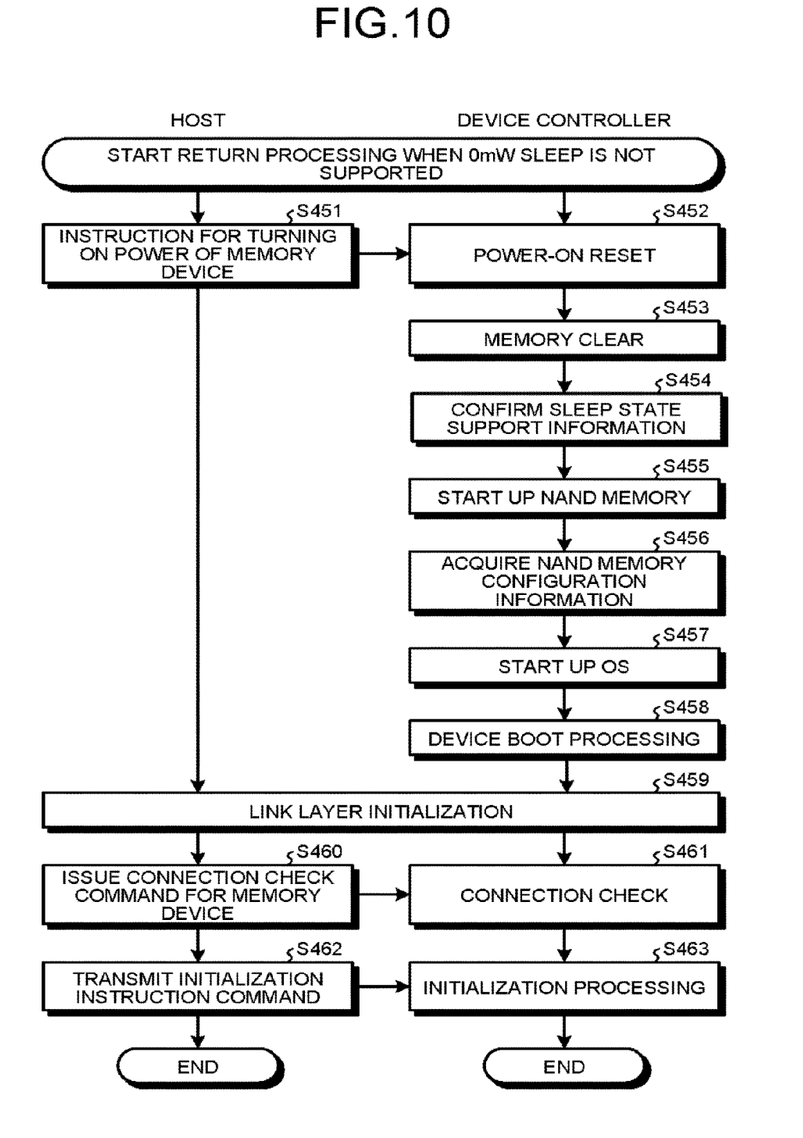
FIG. 10 is a flowchart illustrating an exemplary procedure for the return processing of the information-processing device in a case where the memory device does not support the 0 mW sleep.

FIG. 10 is a flowchart illustrating an exemplary procedure for the return processing of the information-processing device in a case where the memory device does not support the 0 mW sleep. It is assumed here that it is written in the non-volatile memory 230 as the sleep state support information that the 0 mW sleep is not supported.

First, when the host device 1 instructs the memory device 2 to turn on the power (step S451), the device controller 220 of the memory device 2 carries out the power-on reset processing (step S452). Thereafter, the device controller 220 clears the RAM 210 (step S453).

Subsequently, the device controller 220 reads the sleep state support information in the non-volatile memory 230 to confirm the content (step S454). Here using the assumption that the 0 mW sleep is not supported, the device controller 220 recognizes that the 0 mW sleep is not supported.

Thereafter, because the 0 mW sleep is not supported, the device controller 220 starts up the NAND memory 200 (step S455) although the link layer initialization processing is not carried out between the host device 1 and the device controller 220. The device controller 220 then acquires the NAND memory configuration information from the NAND memory 200 that has started up (step S456). Additionally, the device controller 220 starts up the OS (step S457) and carries cut the device boot processing (step S458).

Thereafter, the device controller 220 carries out the initialization processing of the link layer between the host device 1 and the device controller 220 (step S459). In addition, the host device 1 issues the connection check command for the device (step S460) and then the device controller 220 checks the connection through response processing corresponding to the connection check command (step S461).

Subsequently, the host device 1 transmits an initialization instruction command to the device controller 220 (step S462) and then the device controller 220 carries out the initialization processing corresponding to the power down sleep (step S463). For example, this initialization processing is carried out in such a manner that the address information and the like saved in the NAND memory 200 are read out to the RAM 210. This terminates the processing.

The fourth embodiment has been configured to save the sleep state support information to the non-volatile memory 230 such that, in a case where the 0 mW sleep is not supported, the startup of the NAND memory 200 up to the device boot processing are carried out before receiving the link layer initialization request from the host device 1. As a result, in the case of the power down sleep that does not require reading information from the host device 1, the NAND memory 200 is started up prior to the link layer initialization processing, it is possible to reduce a time required for the initialization.

(Fifth Embodiment)

The fourth embodiment has saved the sleep state support information to the non-volatile memory. A fifth embodiment will describe a case where information capable of making the operation of a memory device faster is saved to a non-volatile memory.

An information-processing device according to the fifth embodiment has a configuration similar to that illustrated in FIG. 8 in the fourth embodiment. However, link layer establishment information and access speed support information are saved to the non-volatile memory 230. The link layer establishment information is information required for establishing the connection in the link layer between a host device 1 and the memory device 2. The access speed support information is information relating to ReferenceClock in UniPro which is a communication standard in the link layer, indicating whether a NAND memory 200 is accessible in a high speed mode. The speed mode of the NAND memory 200 is switched depending on a clock frequency. Typically, these types of information are saved in the NAND memory 200. In the embodiment, however, the information is configured to be saved to the non-volatile memory 230. In addition, the SCM is used as the non-volatile memory 230 according to the fifth embodiment.

Furthermore, during the return processing, a device controller 220 reads the link layer establishment information and the access speed support information from the non-volatile memory 230 before starting up the NAND memory 200. As a result, the link layer initialization processing between the host device 1 and the device controller 220 can be completed more quickly than the case of a conventional configuration. Additionally, in a case where the high speed mode is supported, it is possible to transit to the high speed mode before the NAND memory 200 is started up.

Figure 11:
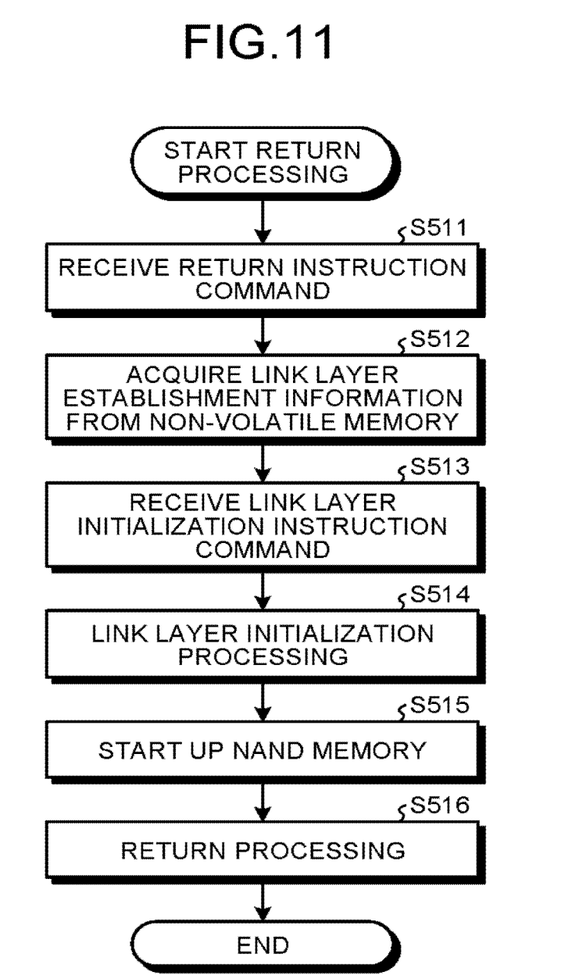
FIG. 11 is a flowchart illustrating an exemplary procedure for the return processing according to a fifth embodiment.

FIG. 11 is a flowchart illustrating an exemplary procedure for the return processing according to the fifth embodiment. Here, the memory device 2 is assumed to be in the sleep state. First, upon receiving the return instruction command from the host device 1 (step S511), the device controller 220 of the memory device 2 acquires the link layer establishment information from the non-volatile memory 230 (step S512). Subsequently, upon receiving a link layer initialization instruction command from the host device 1 (step S513), the device controller 220 uses the link layer establishment information to carry out the link layer initialization processing (step S514).

Thereafter, the device controller 220 starts up the NAND memory 200 (step S515) and carries out the return processing (step S516). This terminates the processing.

In a case where the access speed support information indicating that the NAND memory 200 supports the high speed mode is included in the link layer initialization processing in step S514, the device controller 220 carries the subsequent processing using an access speed included in the access speed support information that has been read.

In the fifth embodiment, the link layer establishment information is saved to the non-volatile memory 230. During the returning of the memory device 2, the device controller 220 reads the link layer establishment information from the non-volatile memory 230 to carry out the link layer initialization processing. As a result, it is possible to reduce a time required for the initialization processing compared to a case where the NAND memory 200 is started up and then the link layer establishment information is read therefrom.

Additionally, in a case where it is noted within the access speed support information that the high speed mode is supported, the subsequent processing is carried out in the high speed mode, whereby the access to the main memory 110 can be made faster.

Note that the aforementioned first to fifth embodiments can be combined. Furthermore, the aforementioned embodiments have been described using the UFS memory device. However, the embodiments can be also applied to another semiconductor storage device such as a memory card, a memory device, or an internal memory as long as the semiconductor storage device similarly operates. As a result, working effects similar to those of the aforementioned embodiments can be obtained. In addition, the aforementioned NAND memory 200 is not limited to the NAND-type flash memory and may be another semiconductor memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device connectable to a host device having a host-side memory, the memory device comprising:
   a first non-volatile memory;
   a volatile memory configured to store data written to or read from the first non-volatile memory;
   a controller configured to transfer data between the first non-volatile memory and the volatile memory; and
   a second non-volatile memory that stores sleep state support information indicating whether the memory device supports a sleep state, the sleep state being a state in which power supplies for the first non-volatile memory, the volatile memory, the controller, and the second non-volatile memory are shut off and information that has been stored in the volatile memory is saved in the host-side memory,
   wherein the controller is configured to:
   carry out transition to the sleep state depending on a sleep instruction from the host device; and upon receiving a return instruction from the host device, refer to the sleep state support information in the second non-volatile memory and when the sleep state is not supported, carry out startup processing of the first non-volatile memory without waiting for link layer establishment processing relative to the host device.

2. The memory device according to claim 1, wherein
the second non-volatile memory holds link layer establishment information used for the link layer establishment processing, and
the controller reads, during the return processing, the link layer establishment information from the second non-volatile memory and carries out the link layer establishment processing.

3. The memory device according to claim 1, wherein
the second non-volatile memory holds access speed support information indicating whether a high speed mode is supported, and
the controller reads, during the return processing, the access speed support information from the second non-volatile memory and when the high speed mode is supported, carries out processing in the high speed mode.

4. The memory device according to claim 3,
wherein the second non-volatile memory is a memory having a fast access speed and a small memory capacity compared to the first non-volatile memory.

\* \* \* \* \*